United States Patent
Shi et al.

(10) Patent No.: US 7,762,076 B2
(45) Date of Patent: Jul. 27, 2010

(54) ATTACHMENT OF A CERAMIC COMBUSTOR CAN

(75) Inventors: Jun Shi, Glastonbury, CT (US); Jason Lawrence, East Hartford, CT (US); David J. Bombara, New Hartford, CT (US); David C. Jarmon, Kensington, CT (US); Michael T. Weber, Windsor Locks, CT (US); Richard S. Tuthill, Bolton, CT (US); Jeffrey D. Melman, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 863 days.

(21) Appl. No.: 11/254,876

(22) Filed: Oct. 20, 2005

(65) Prior Publication Data

US 2008/0010990 A1    Jan. 17, 2008

(51) Int. Cl.
*F02C 1/00* (2006.01)
*F02G 3/00* (2006.01)
(52) U.S. Cl. .......................................... 60/753; 60/796
(58) Field of Classification Search .................. 60/752, 60/753, 796, 800
See application file for complete search history.

(56) References Cited

U.S. PATENT DOCUMENTS

| | | | | |
|---|---|---|---|---|
| 2,839,894 A * | 6/1958 | Shutts et al. | .................. | 60/797 |
| 3,999,376 A * | 12/1976 | Jeryan et al. | .................. | 60/799 |
| 4,130,375 A * | 12/1978 | Korta | .......................... | 415/161 |
| 4,363,208 A | 12/1982 | Hoffman et al. | | |
| 4,573,320 A | 3/1986 | Kralick | | |
| 5,392,596 A | 2/1995 | Holsapple et al. | | |
| 6,200,092 B1 * | 3/2001 | Koschier | ..................... | 415/191 |
| 6,397,603 B1 * | 6/2002 | Edmondson et al. | .......... | 60/753 |
| 6,655,148 B2 * | 12/2003 | Calvez et al. | ................. | 60/753 |
| 6,996,976 B2 * | 2/2006 | Rumminger et al. | .......... | 60/295 |
| 2005/0050902 A1 * | 3/2005 | Anichini et al. | ............... | 60/800 |

* cited by examiner

*Primary Examiner*—Michael Cuff
*Assistant Examiner*—Andrew Nguyen
(74) *Attorney, Agent, or Firm*—Carlson, Gaskey & Olds PC

(57) ABSTRACT

A combustor assembly includes a metal section having an axial slot that receives a ceramic section. A clamp is received about the axial slot to secure the metal section and ceramic section together. Tabs on the metal section, a gasket between the metal section and the ceramic section, and springs within the clamp deform an amount that is greater than a thermal expansion difference between the metal section and the ceramic section to maintain a clamping force of the clamp.

16 Claims, 2 Drawing Sheets

ATTACHMENT OF A CERAMIC COMBUSTOR CAN

This invention was made with government support under Contract No. N00014-03-C-0477 awarded by the Office of Naval Research. The government therefore has certain rights in this invention.

BACKGROUND OF THE INVENTION

This invention relates combustion engines and, more particularly, to a combustor assembly having a unique attachment between a ceramic combustor can and a metal section.

Conventional combustion engines, such as those used in aircraft, utilize a combustor to ignite a mixture of fuel and compressed air to propel the aircraft. To reduce undesirable emission products produced in combustion of the fuel and air mixture, it is desirable to reduce the temperature at which the fuel and air mixture burns. This requires a high percentage of air to be mixed with the fuel (i.e., a "lean" mixture). Such a lean mixture reduces the amount of air available to cool the combustor and increases the combustor temperature. For combustors made entirely of metal, the increase in temperature may exceed a desirable operating temperature of the metal.

Ceramic materials provide excellent high temperature resistance and have been considered for use in combustors to resist the high temperatures. Disadvantageously, the coefficient of thermal expansion of ceramics is typically much lower than that of metals, which may lead to thermal stress between parts made of ceramic and parts made of metal during operation of the aircraft engine. Furthermore, the difference in coefficients of the thermal expansion between ceramic and metal renders typical joining methods, such as welding or bonding, ineffective.

Accordingly, there is a need for a combustor assembly that provides and maintains a tight fit between a ceramic part and a metal part over a relatively wide temperature range.

SUMMARY OF THE INVENTION

This invention is a combustor assembly including a unique attachment between a metal section and a ceramic section that accommodates a thermal expansion difference between the metal and the ceramic.

An exemplary combustor assembly according to the present invention includes a metal section having an axial opening that receives the ceramic section. A clamp is received around the axial opening to secure the metal section and the ceramic section together. Tabs on the metal section, a gasket between the metal section and the ceramic section, and springs within the clamp deform in a radial direction to cooperatively offset the thermal expansion difference to maintain a clamping force.

An example method of these securing thermally mismatched sections together includes a step of elastically deforming at least two deformation members in a radial direction to cooperatively provide an amount of deformation that is greater than a thermal expansion difference in the radial direction between a metal and a ceramic section to maintain a securing force between the sections.

BRIEF DESCRIPTION OF THE DRAWINGS

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
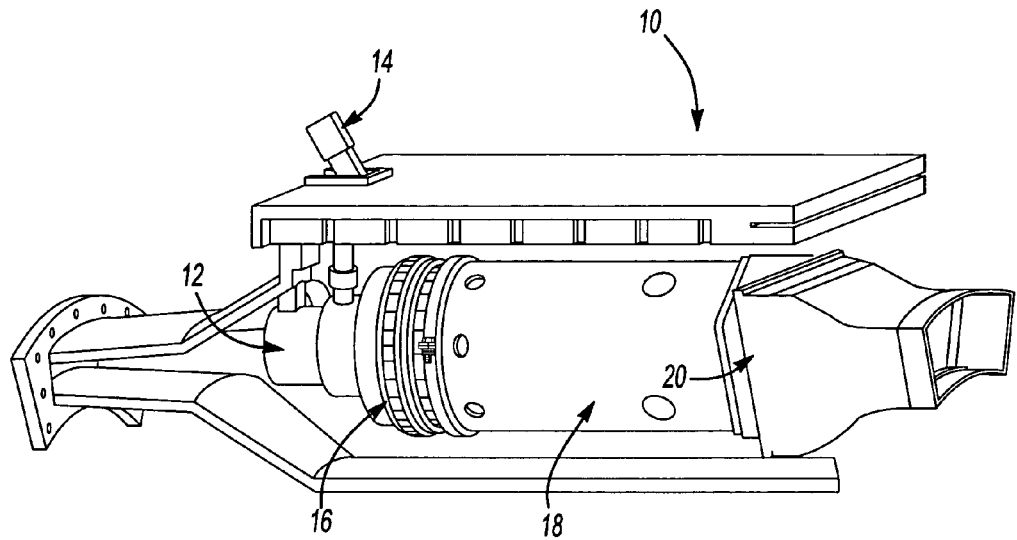
FIG. 1 is a perspective view of an example combustion section.

FIG. 1 illustrates selected portions of an example combustion section 10 used, for example, in a gas turbine engine for an aircraft. In this example, the combustor section 10 of a gas turbine engine includes an air fuel mixer 12 that supplies a mixture of air and fuel to an igniter 14. The air fuel mixer 12 and the igniter 14 are received in a metal section 16. The metal section 16 is secured to a ceramic can 18, which receives the ignition products of the ignited fuel and air mixture. The ceramic can 18 directs the ignition products through a transition duct 20 and into a turbine section (not shown) of a gas turbine engine.

A flame temperature distribution in the combustion section 10 is such that the front end near the igniter 14 has a relatively cool flame and the aft end near the ceramic can 18 and transition duct 20 has a relatively hot flame. Utilizing the metal section 16 near the relatively cooler flame and the ceramic can 18 near the relatively hotter flame provides the benefit of reducing undesirable carbon monoxide emissions produced in previously known combustor assemblies. In previously known combustor assemblies, carbon monoxide is produced during cooling of the ignition products in the combustion section 10. In the illustrated example, the ceramic material of the ceramic can 18 does not require as much cooling as a metal material. Since there is less cooling with the ceramic can 18, less carbon monoxide is produced compared to previously known combustor assemblies that utilize a metallic can. Further, the ceramic material of the ceramic can 18 is less dense than metal and therefore reduces the weight of an aircraft utilizing a turbine jet engine with a ceramic can. Furthermore, utilizing the relatively inexpensive metal section 16 (compared to ceramic sections) near the cooler flame portion reduces the expense of the combustion section 10.

Figure 2:
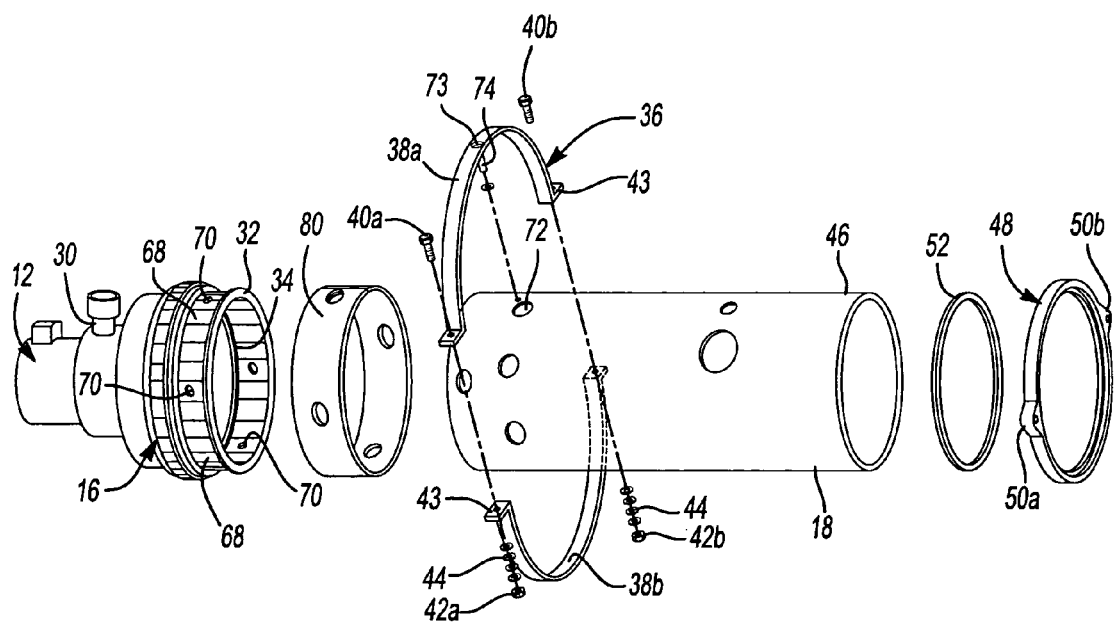
FIG. 2 is an exploded view of selected portions of the combustion section shown in FIG. 1.

FIG. 2 shows an exploded view of selected portions of the combustion section 10. The metal section 16 includes a forward portion 30 and a circular portion 32 welded to the forward portion 30. The circular portion 32 has an axial slot 34 and tabs 68 that are circumferentially contiguously arranged to provide the axial slot 34 for receiving the ceramic can 18.

A clamp 36 is received around the axial slot 34 and the tabs 68 to secure the metal section 16 and the ceramic can 18 together. The clamp 36 in this example includes first and second sections 38a and 38b that are secured together with bolts 40a and 40b and nuts 42a and 42b. Alternatively, the clamp 36 can be made of more than two sections. Springs 44, such as Bellville washers, are received onto the bolts 40a and 40b between the nuts 42a and 42b and flanges 43 of the second section 38b. The springs 44 maintain a tension on the bolts 40a and 40b to maintain a clamping force of the clamp 36 around the metal section 16 and ceramic can 18, as described below. In one example, the clamp 36 is relatively thin and narrow such that the clamp 36 elastically stretches when the clamping force is applied.

Optionally, the clamp 36 is made of a relatively low thermal expansion material. In one example, the clamp 36 is made of an alloy having a coefficient of thermal expansion that is approximately double that of the ceramic material forming the ceramic can 18. This provides the benefit of reducing some of the thermal expansion difference between the clamp 36 and the ceramic can 18 to maintain the clamping load.

An aft end 46 of the ceramic can 18 is received through a support ring 48, which is secured at bosses 50a and 50b to the transition duct 20. The support ring 48 is relatively low stiffness compared to the ceramic can 18 and therefore introduces minimal thermal stress to the ceramic can 18 in a radial direction.

A seal 52, such as a ceramic rope, is received between the ceramic can 18 and the support ring 48 to seal the combustion section 10 from the turbine section (not shown) of the aircraft. The fit between the support ring 48, seal 52, and the ceramic can 18 is relatively loose such that the support ring 48 and the seal 52 do not significantly constrain axial thermal expansion of the ceramic can 18 during high temperature operation.

Figure 3:
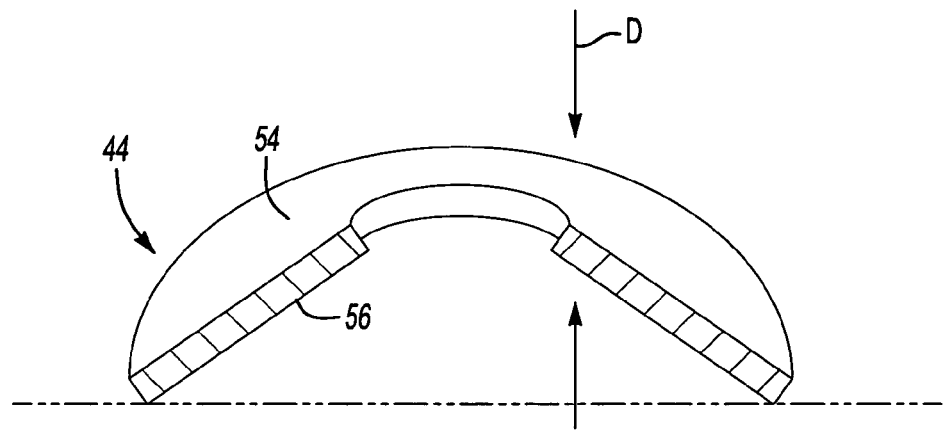
FIG. 3 is a cross-sectional view of an example spring washer.

Referring to FIG. 3, the springs 44 are domed and include an outer surface 54 and an inner surface 56. The springs 44 may be made of a high temperature alloy, such as a nickel-based alloy. When the bolts 40a and 40b are tightened with the respective nuts 42a and 42b, the springs 44 are compressed in the direction D into a nearly flat shape. As is known, the springs 44 are biased to spring back to the domed shape. In the flat shape, the bias of the springs 44 to the domed shape provides a tension on the bolts 40a and 40b.

The springs 44 are stacked in parallel where the outer surfaces 54 of the springs 44 face in the same direction. Alternatively, the springs 44 can be stacked in series where the outer surfaces 54 of consecutive springs 44 face towards each other. Springs 44 stacked in parallel provide an increased tension on the bolts 40a and 40b, whereas springs 44 stacked in series provide greater deflection at a lower tension. Preferably, the springs 44 are configured to deflect more upon tightening than an expected amount of thermal expansion difference between the clamp 36 and the ceramic can 18 to maintain a desired clamping load over a variety of temperature ranges. Given this description, one of ordinary skill will be able to recognize appropriate spring 44 configurations to meet their particular needs.

Figure 4:
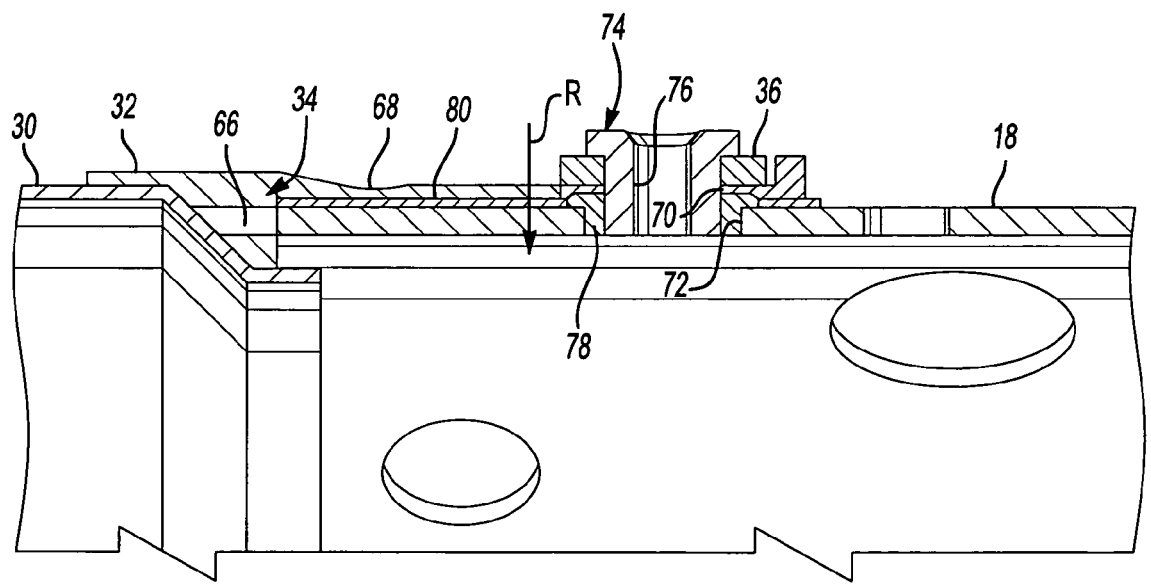
FIG. 4 is a schematic cross-sectional view of an attachment between a metal section and a ceramic can.

Referring to FIG. 4, the ceramic can 18 is received into the axial slot 34 between the circular portion 32 and the forward section 30. The annular section 32 is welded onto the forward section 30. In one example, the annular section 32 is machined from a solid annular ring and includes axial sub-slots 66 that receive the ceramic can 18. The axial subslots 66 provide compliance in a radial direction between the ceramic can 18 and the metal section 16. This helps to secure the metal section 16 and the ceramic can 18 together.

The annular section 32 includes a plurality of tabs 68 that extend axially from the forward section 30 about the ceramic can 18. In the illustrated example, one of the tabs includes an opening 70 that corresponds to an opening 72 in the ceramic can 18 and to an opening 73 in the second section 38b of the clamp 36. A pin 74 which is non-threaded is received through the openings 70, 72, and 73 to secure the ceramic can 18 and metal section 16 together and resist axial movement between them. The pin 74 may be welded to the clamp 36 before assembly of the combustion section 10.

In the disclosed example, the pin 74 is made of metal or metal alloy. The pin 74 includes a cooling passage 76 that allows air to flow through. The air internally cools the pin 74 and maintains the temperature of the fastener below a desirable operating temperature of the metal or alloy.

A bushing 78 is received between the pin 74 and the opening 72 of the ceramic can 18. The bushing 78 evenly distributes stress between the pin 74 and the ceramic can 18 and prevents relatively large stress concentrations.

A gasket 80 is received between the tabs 68 and the ceramic can 18. When the clamp 36 is tightened, the gasket 80 compresses in the radial direction.

When the clamp 36 is tightened around the metal section 16 and the ceramic can 18, the springs 44, tabs 68, and gasket 80 deflect in the radial direction. Each acts as a spring to provide a tension bias on the clamp 36. The tabs 68 bend radially inward along the direction R in FIG. 4 upon tightening the clamp 36 and tend to spring radially outward to provide the tension on the clamp 36. The gasket 80 compresses and tries to decompress, providing a tension in the radial direction on the tabs 68, which provides a bias tension on the clamp 36. The springs 44 deflect to provide a biasing tension on the clamp 36.

During operation at a relatively high temperature, the metal section 16 thermally expands more than the ceramic can 18. The clamp 36, which is also made of a metal material, also thermally expands more than the ceramic can 18. As the metal section 16 and clamp 36 thermally expand, the clamping force decreases. In the illustrated example, the springs 44, gasket 80, and tabs 68 deflect by a combined amount in the radial direction that is greater than a radial thermal expansion difference between the metal section 16 and the ceramic can 18. This provides the benefit of maintaining a clamping force between the first and second sections 38a and 38b of the clamp 36. That is, the metal parts thermally expand more than the ceramic part and the spring components (i.e., the tabs 68, gasket 80, and springs 44) offset the difference in thermal expansion to at least partially maintain the clamping force.

Although example embodiments of this invention have been disclosed, a worker of ordinary skill in this art would recognize that certain modifications would come within the scope of this invention. For that reason, the following claims should be studied to determine the true scope and content of this invention.

We claim:

1. A gas turbine combustor assembly comprising:
   a metal section defining an axis and including a plurality of tabs that are circumferentially arranged to provide an axial slot;
   a ceramic section received into the axial slot; and
   a clamp extending circumferentially about the perimeter of the tabs of the metal section and the ceramic section to clamp the metal section and the ceramic section together;
   and wherein the ceramic section is a can combustor liner defining a combustion chamber and the metal section is upstream of the ceramic section; and wherein the metal section includes a first diameter section and a second diameter section that is less than the first diameter section, the axial slot being between the second diameter section and the plurality of tabs extending axially from the first diameter section.

2. The assembly as recited in claim 1, wherein the annular section includes an axial sub-slot that receives the ceramic section.

3. The assembly as recited in claim 1, wherein the plurality of tabs is elastically deformable in a radial direction.

4. The assembly as recited in claim 3, wherein at least one of the plurality of tabs includes a tab opening that corresponds to an opening in the ceramic section.

5. The assembly as recited in claim 3, further comprising a gasket between the plurality of tabs and the ceramic section.

6. The assembly as recited in claim 1, further comprising a support ring secured to an exit duct, the support ring receiving the ceramic section there though, and a ceramic seal between the support ring and the ceramic section.

7. The assembly as recited in claim 1, further comprising a fastener received through the clamp, metal section, and ceramic section to resist relative axial and circumferential movement.

8. The assembly as recited in claim 7, further comprising a gasket between the fastener and at least the ceramic section.

9. The assembly as recited in claim 7, wherein the fastener includes an internal cooling passage.

10. The assembly as recited in claim 1, wherein the clamp includes at least a first section and a second section secured together with a threaded fastener and a nut.

11. The assembly as recited in claim 10, further comprising at least one spring between the threaded fastener and the nut.

12. The assembly as recited in claim 11, further comprising a plurality of springs between the threaded fastener and the nut.

13. The assembly as recited in claim 1, further comprising a spring gasket between the metal section and the ceramic section.

14. The assembly as recited in claim 13, wherein the clamp is made of a first material having a first coefficient of thermal expansion between about $4 \times 10^{-6}/°$ F. and about $6 \times 10^{-6}/°$ F.

15. The assembly as recited in claim 14, wherein the spring gasket is made of a second material having a second coefficient of thermal expansion that is greater than the first coefficient of thermal expansion.

16. The assembly as recited in claim 1, wherein the metal section includes a plurality of tabs elastically deflected radially inwards such that the plurality of tabs exert a tension on the clamp.

\* \* \* \* \*